United States Patent [19]

Allison

[11] Patent Number: 4,773,482
[45] Date of Patent: Sep. 27, 1988

[54] REDUCING PERMEABILITY OF HIGHLY PERMEABLE ZONES IN OIL AND GAS FORMATIONS

[75] Inventor: Joe D. Allison, Ponca City, Okla.

[73] Assignee: Conoco Inc., Ponca City, Okla.

[21] Appl. No.: 56,193

[22] Filed: Jun. 1, 1987

[51] Int. Cl.⁴ ................................. E21B 33/138
[52] U.S. Cl. .............................. 166/270; 166/295; 166/300; 523/130
[58] Field of Search ............ 166/270, 281, 294, 295, 166/300; 405/264; 523/130, 132

[56] References Cited

U.S. PATENT DOCUMENTS

| | | | |
|---|---|---|---|
| 3,491,049 | 1/1970 | Gibson et al. | 166/295 X |
| 3,500,929 | 3/1970 | Eilers et al. | 166/295 |
| 3,762,476 | 10/1973 | Gall | 166/270 X |
| 4,155,405 | 5/1979 | Vio | 166/295 |
| 4,216,307 | 8/1980 | Yuasa et al. | 528/422 |
| 4,326,009 | 4/1982 | Royer | 428/407 |
| 4,519,843 | 5/1985 | Willis et al. | 523/130 X |
| 4,657,948 | 4/1987 | Roark et al. | 523/130 |
| 4,703,801 | 11/1987 | Fry et al. | 523/130 X |

Primary Examiner—George A. Suchfield

[57] ABSTRACT

High permeability zones in subterranean formations are reduced in permeability by the gelation of water soluble polymers of polyalkylenimines, polyalkylenepolyamines and mixtures thereof in such formations with cross-linking agents containing difunctional groups which are capable of cross-linking with said polymers.

10 Claims, 1 Drawing Sheet

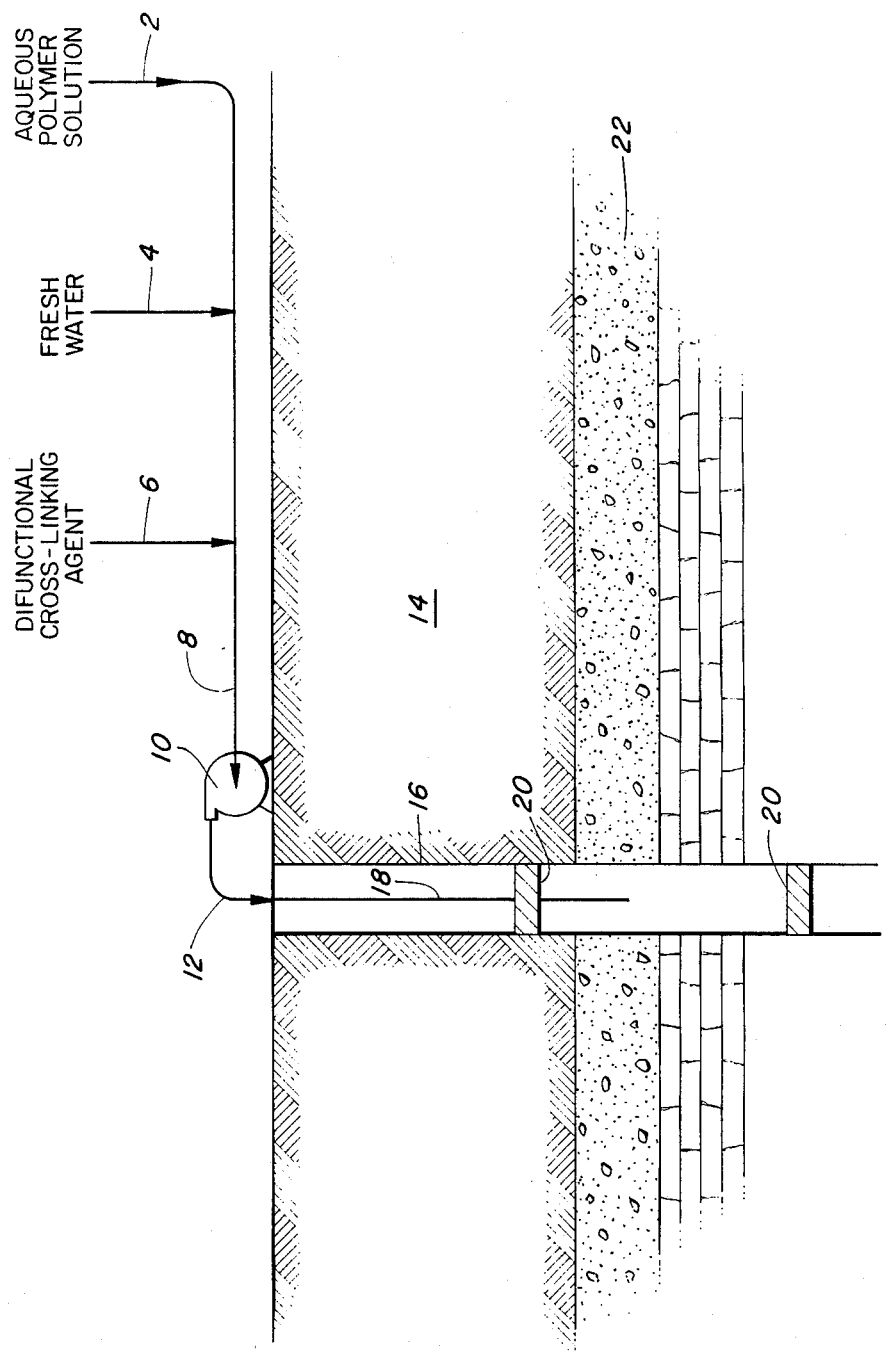

REDUCING PERMEABILITY OF HIGHLY PERMEABLE ZONES IN OIL AND GAS FORMATIONS

BACKGROUND AND SUMMARY OF THE INVENTION

The problem of fluid loss to highly porous underground formations penetrated by a well has, of course, been long recognized. These highly permeable zones are often called thief zones. In water or steam stimulation operations, for example, a serious problem is often encountered because a very small interval of the total production zone may be taking 80 percent or more of the total injected fluid. When this happens, the benefit of the injection project may be lost or greatly reduced.

An isolated high-permeability zone or fracture can be plugged at the well bore face by a shallow layer of applied cement, though such a permanent, relatively irrevocable technique often is undesirable. More desirably, a communicating high-permeability zone is plugged to some considerable depth in order to prevent flood water from otherwise merely flowing around a narrow shallow plug and back into the high-permeability or swept zone. Indepth plugging of a relatively high-permeability zone converts the zone into a much lower permeability zone. Then, subsequently injected flood water or other fluid will tend to enter the formerly by-passed, but now relatively more permeable, hydrocarbon-bearing zones and thus mobilize increased amounts of hydrocarbons therefrom.

Various methods have been used in the past to achieve indepth gelling, such as gelable systems triggered by a following aqueous acidic solution injection for subsequent pH adjustment. However, injecting an acidic solution following the polymer solution may result in gelation occurring so rapidly that a sufficient indepth plugging is not effectively obtained in the most permeable strata where desired. In another method, water, a polymer and a cross-linking agent capable of gelling the polymer, such as a sequestered polyvalent metal cation, are admixed, and, just before injection into an underground formation, an acid is added thereto to effect gelation. But, when the acid is pre-mixed with the gelable composition, the gelation can be too fast, making it necessary to shear the gelled polymer in order to be able to obtain adequate injection, which reduces effectiveness of the gel.

Indepth gelling has also been effected by the controlled gelation of sodium silicate. Also, polymers have previously been gelled in permeable zones by borate ions supplied in various ways.

According to this invention, permeability of a highly permeable zone in a subterranean formation is reduced by introducing into the formation an aqueous solution of a water soluble polymer selected from the group consisting of polyalkylenimines and polyalkylenepolyamines, mixtures thereof and a cross-linking agent containing difunctional groups which are capable of cross-linking with and gelling said polymers.

PRIOR ART

U.S. Pat. Nos. 4,216,307; 4,309,324 and 4,374,243 disclose that polyhexamethylenimine is useful as a gelling agent for organic liquids.

U.S. Pat. No. 3,909,469 discloses an adhesive composition comprising a solution of polyethylenimine containing an aldehyde which causes the solution to gel or form gel particles. The solution also contains water soluble carboxylic acid to inhibit gel formation.

U.S. Pat. No. 4,326,009 discloses the cross-linking between polyethylenimine and glutaraldehyde.

"MONTREK" polyethylenimine products, a brochure published by Dow Chemical Co., discloses the reaction of polyethylenimine with aldehydes, ketones, alkyl halides, isocyanates, thioisocyanates, activated double bonds, epoxides, cyanamides and acids.

BRIEF DESCRIPTION OF THE DRAWING

The drawing is a schematic flow diagram (partially in cross-section) of an apparatus arrangement which illustrates the method for carrying out the invention.

DETAILED DESCRIPTION OF THE INVENTION

Referring now to the drawing, there is provided a well bore 16 penetrating an earth formation 14 and a streak or zone 22 of high permeability. Well 16 is preferably provided with packing means 20 to isolate zone 22. An aqueous solution of polymer, such as polyethylenimine, is introduced through lines 2 and 8, passing through pump 10 and line 12 into well bore 16. The polymer entering the well passes downwardly through tubing string 18 and enters formation 22. The cationic characteristics of this material cause it to be adsorbed onto the formation rock.

Waterflood water (usually formation water) is then injected into the formation in a similar manner via line 4. The water serves to clean the well bore and the adjacent formation of polyethylenimine to prevent premature gelling in these locations upon introduction of the gelling agent. In the next step, a cross-linking gelling agent containing difunctional groups, such as glutaraldehyde, is injected into the formation in a corresponding manner through line 6. The cross-linking agent reacts with the adsorbed polymer and leaves additional reactive groups open for further reaction. A second water injection is then carried out via line 4. Finally, additional polymer is injected through line 2. This additional material reacts with the open reactive groups of the cross-linking agent in the formation to form a cross-linked gel system. If desired, the foregoing steps can be repeated to obtain any desired degree of permeability reduction. Thus, in a water flood operation where zone 22 has previously passed a major portion of the fluids injected into the formation, these fluids are now forced into other zones which contain oil thereby increasing the production of oil from the formation.

In the procedure illustrated by the drawing, the cross-linking agent and water soluble polymer are separately introduced into the subterranean formation. However, with certain precautions (discussed later), these materials may be combined outside the formation.

The water soluble polymers which are used in the practice of the invention are selected from the class consisting of polyalkylenimines, polyalkylenepolyamines and mixtures thereof. The preferred polyalkylenepolyamines are the polymeric condensates of lower molecular weight polyalkylenepolyamines and a vicinal dihaloalkane. The polyalkylenimines are best illustrated by polymerized ethylenimine or propylenimine. The polyalkylenepolyamines are exemplified by polyethylene and polypropylenepolyamines.

The above described water soluble polymers are generally used in this invention in amounts of about 0.1% to 50% by weight based upon the weight of the polymer and water combination and preferably in amounts between about 2% and about 6%.

Additional details concerning these polymers and their method of preparation may be found in U.S. Pat. No. 3,491,049 which is hereby incorporated by reference.

Any difunctional compounds which are capable of reacting with and cross-linking the above described polymers may be used in the process of the invention. Included are such compounds as difunctional aldehydes, ketones, alkyl halides, isocyanates, compounds with activated double bonds and carboxylic acids. These compounds and their reactions with the amine groups of the polyalkylenimine and polyalkylenepolyamine polymers are illustrated by the following reactions:

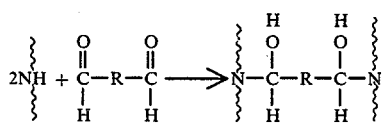

Where R is straight chain or branched alkyl containing 0 to about 4 carbon atoms.

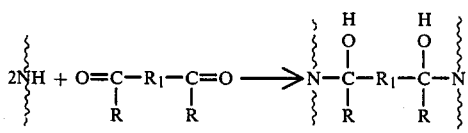

Where R and $R_1$ are straight chain or branched alkyl, R contains 0 to about 2 carbon atoms and $R_1$ contains 0 to about 4 carbon atoms.

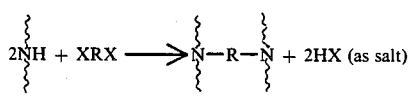

Where X is halogen and R is straight chain or branched alkyl containing 1 to about 6 carbon atoms.

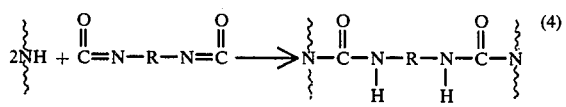

Where R is straight chain or branched alkyl containing 1 to about 4 carbon atoms.

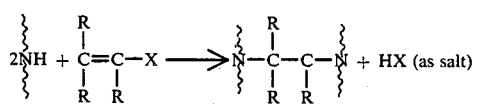

Where X is a reactive group such as halogen, oxygen, nitro, etc and R is straight chain or branched alkyl containing 0 to about 2 carbon atoms.

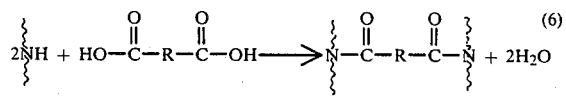

Where R is straight chain or alkyl containing 0 to about 4 carbon atoms.

Specific difunctional cross-linking agents include such compounds as glutaraldehyde, succinaldehyde, 2,4-pentadione, 1,2-dichloroethane, 1,3-diisocyanopropane, dimethylketene and adipic acid.

The difunctional cross-linking agents can be used in amounts from about 0.1 percent to about 10 percent by weight of the polymer, but preferably are employed in amounts between about 2 percent and about 4 percent by weight. A water carrier is normally provided for the cross-linking agent, usually in an amount to provide a concentration of cross-linking agent between about 0.2 percent and about 30 percent by weight.

The reactivity of the cross-linking agents and polymers will vary widely depending on the amounts and the particular materials used. For example, glutaraldehyde, even in very small quantities, cross-links with polyethylenimine almost immediately. Other difunctional cross-linking agents are much slower to react. When the reactivity of the materials used in carrying out the invention is such that they cannot be combined outside the formation to be treated without premature cross-linking, the stepwise procedure illustrated in the description of the drawing is followed.

The volume of material (polymer and cross-linking agent) injected in the zone of high permeability to be treated is determined by the size of the zone. Typically, volumes from about 5 to about 100 percent of the pore volume of the zone to be treated are used. Once the amount of material to be injected has been determined and the injection rate has been set, the treatment time can then be estimated. If the polymer and cross-linking agent are to be injected into the formation together, they are then selected to provide a material which is stable for the amount of time equal to the required treatment time.

The following example illustrates the results obtained in carrying out the invention:

EXAMPLE

In a waterflood of an oil-bearing formation, salt water is injected for six months. At the end of this time, the well is logged and it is found that 70 percent of the injection water is being lost into a thief zone.

Two thousand barrels of a mixture of an aqueous solution of polyethylenepolyamine and 1 percent dichloroethane (5 wt%) is introduced into the injection well over a period of 36 hours. Upon completion of the injection, that portion of the mixture remaining in the well bore is displaced into the formation with waterflood water.

Within one day after injection, the dichloroethane reacts with and cross-links the polyethylenepolyamine to form a gel, thereby plugging the entire thief zone.

Upon logging the injection well a second time, it is determined that the thief zone is now taking only 10 percent of the injection water. Thus, the permeability of the thief zone is substantially reduced by the method of the invention.

I claim:

1. A process for reducing the permeability of a subterranean formation traversed by a well bore which comprises:

(a) injecting into the formation via the well bore an aqueous solution of a water soluble polymer selected from the group consisting of polyalkylenimines, polyalkylenepolyamines and mixtures thereof, (b) injecting water into the formation, (c) injecting into the formation a cross-linking agent containing difunctional groups which is capable of cross-linking with said polymer, (d) injecting water into the formation, (e) injecting into the formation a further amount of said polymer solution whereby indepth gelling of the polymer takes place in the formation.

2. The process of claim 1 in which the water soluble polymer is a polyalkylenimine.

3. The process of claim 2 in which the cross-linking agent containing difunctional groups is selected from the group consisting of difunctional aldehydes, ketones, alkyl halides, isocyanates, carboxylic acids and compounds having activated double bonds.

4. The process of claim 3 in which the cross-linking agent is glutaraldehyde and the water soluble polymer is polyethylenimine.

5. The process of claim 4 being repeated a sufficient number of times to attain a desired permeability reduction.

6. A process for reducing the permeability of a subterranean formation traversed by a well bore which comprises injecting into the formation via the well bore an aqueous solution of a water soluble polyalkylenimine polymer and a cross-linking agent containing difunctional groups which are capable of delayed cross-linking with said polymer whereby delayed indepth gelling of the polymer takes place in the formation.

7. The process of claim 6 in which the cross-linking agent containing difunctional groups is selected from the group consisting of difunctional aldehydes, ketones, alkyl halides, isocyanates, carboxylic acids and compounds having activated double bonds.

8. The process of claim 6 in which the cross-linking agent is a dialdehyde.

9. A process for reducing flow into a thief zone penetrated by a water injection well bore which comprises injecting down said well bore and into said thief zone a mixture of an aqueous solution of a water soluble polyalkylenimine polymer and a cross-linking agent containing difunctional groups which are capable of delayed cross-linking with said polymer whereby delayed indepth gelling of the polymer takes place in the formation, said cross-linking agent being selected from the group consisting of difunctional aldehydes, ketones, alkyl halides, isocyanates, carboxylic acids and compounds having activated double bonds.

10. The process of claim 9 in which the cross-linking agent is a dialdehyde.

* * * * *